United States Patent
Hornsby et al.

(10) Patent No.: US 11,861,262 B2
(45) Date of Patent: Jan. 2, 2024

(54) AUDIO DETECTION AND SUBTITLE PRESENCE

(71) Applicant: Snap Inc., Santa Monica, CA (US)

(72) Inventors: David Michael Hornsby, Surrey (GB); Georgiy Kassabli, London (GB); Kevin Joseph Thornberry, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/886,002

(22) Filed: May 28, 2020

(65) Prior Publication Data
US 2021/0373843 A1    Dec. 2, 2021

(51) Int. Cl.
| | |
|---|---|
| *G06F 3/16* | (2006.01) |
| *G06F 3/0484* | (2022.01) |
| *H04N 5/272* | (2006.01) |
| *H04N 5/278* | (2006.01) |
| *H04N 21/47* | (2011.01) |
| *H04N 21/472* | (2011.01) |

(52) U.S. Cl.
CPC ............ *G06F 3/165* (2013.01); *G06F 3/0484* (2013.01); *H04N 5/272* (2013.01); *H04N 5/278* (2013.01); *H04N 21/47* (2013.01); *H04N 21/472* (2013.01)

(58) Field of Classification Search
CPC ..... G06F 3/165; G06F 3/0484; H04N 21/472; H04N 21/47; H04N 5/272; H04N 5/278
See application file for complete search history.

(56) References Cited

U.S. PATENT DOCUMENTS

| | | | |
|---|---|---|---|
| 7,586,549 B2* | 9/2009 | Heo | H04N 21/42203 386/239 |
| 8,301,699 B1 | 10/2012 | Knight et al. | |
| 11,200,022 B2* | 12/2021 | Chen | G06F 21/51 |
| 11,340,862 B2* | 5/2022 | Garmark | G06F 3/04842 |
| 2009/0036108 A1* | 2/2009 | Cho | G06F 9/4843 455/418 |
| 2010/0066904 A1 | 3/2010 | Schindler et al. | |
| 2018/0004396 A1 | 1/2018 | Ying | |
| 2018/0165059 A1 | 6/2018 | Agarwal et al. | |
| 2020/0084505 A1* | 3/2020 | Reid | H04N 21/4396 |
| 2020/0358897 A1* | 11/2020 | Dellinger | H04M 1/72454 |
| 2021/0011588 A1* | 1/2021 | Coffman | G06F 3/0482 |
| 2021/0014613 A1* | 1/2021 | Carrigan | G06F 3/167 |

FOREIGN PATENT DOCUMENTS

| | | |
|---|---|---|
| CN | 115668957 A | 1/2023 |
| WO | WO-2021242985 A1 | 12/2021 |

OTHER PUBLICATIONS

"How to use your iPhone while on a phone call", Oct. 30, 2019, https://www.howtogeek.com/444758/how-to-use-your-iphone-while-on-a-phone-call/, 7 pages (Year: 2019).*

"International Application Serial No. PCT/US2021/034458, International Search Report dated Aug. 26, 2021", 4 pgs.

"International Application Serial No. PCT/US2021/034458, Written Opinion dated Aug. 26, 2021", 5 pgs.

"International Application Serial No. PCT/US2021/034458, International Preliminary Report on Patentability dated Dec. 8, 2022", 7 pgs.

* cited by examiner

*Primary Examiner* — Haimei Jiang
(74) *Attorney, Agent, or Firm* — Schwegman Lundberg & Woessner, P.A.

(57) ABSTRACT

Methods, systems, and devices for facilitating simultaneous execution of applications so that associated audio playback corresponds to user expectation.

20 Claims, 7 Drawing Sheets

AUDIO DETECTION AND SUBTITLE PRESENCE

BACKGROUND

Consumer electronics devices, such as smartphones and tablet devices, conventionally implement an audio playback function. Applications and device functions that are configured to use the audio playback function may request access to the audio playback function. The device may then grant access to the audio playback function for one requesting application or device function at a time.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
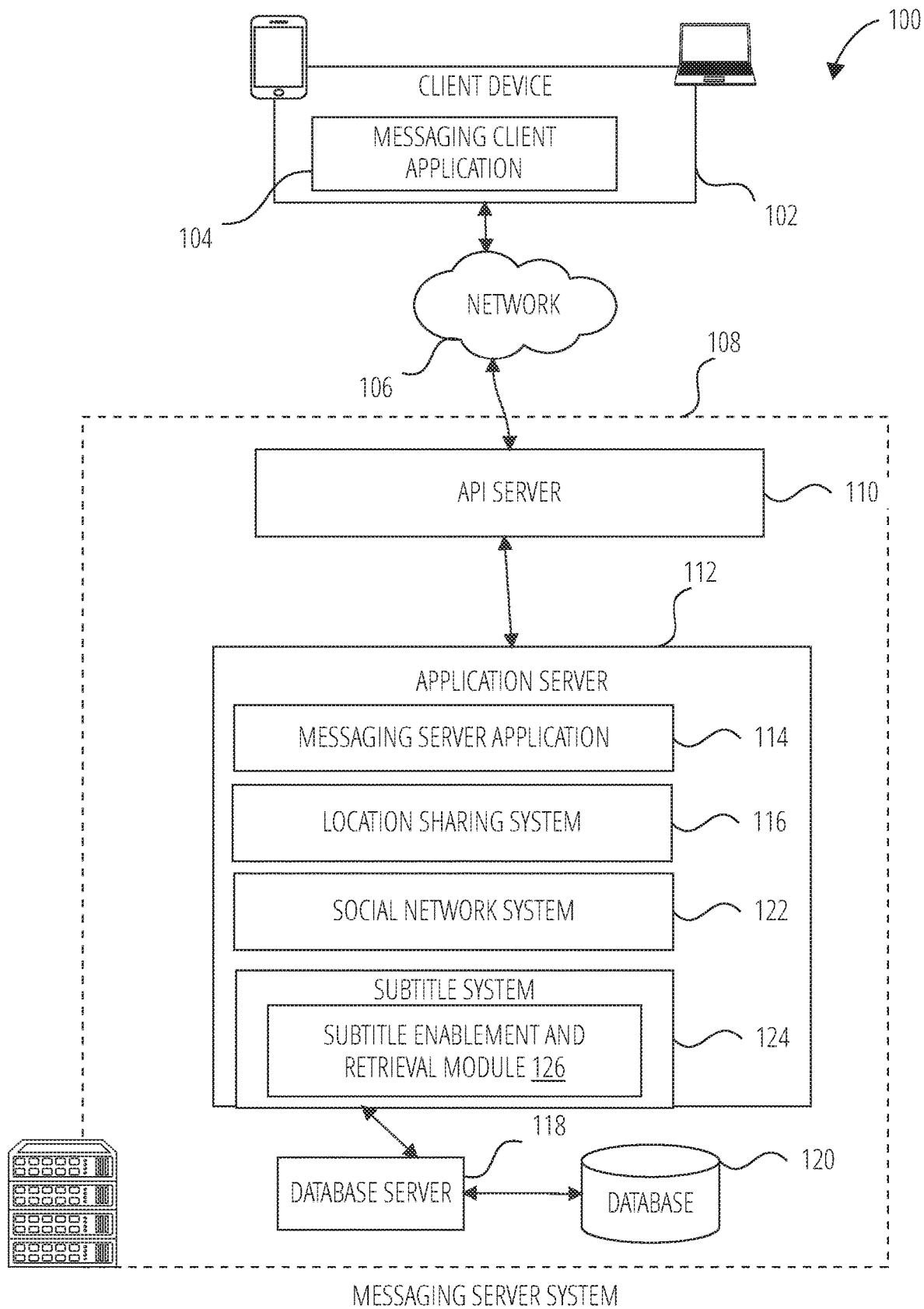
FIG. 1 is a diagrammatic representation of a networked environment in which the present disclosure may be deployed, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Consumer electronics devices, such as smartphones and tablet devices, conventionally implement an audio playback function. Applications and device functions (hereafter referred to as "applications") that are configured to use the audio playback function may request access to the audio playback function. The device may then grant access to audio playback function for one requesting application at a time.

Where such a device simultaneously executes more than one application or device function and each requests access to the audio playback function, the device may grant access to an unexpected or undesirable requesting application or device function.

Users experiencing unexpected or undesirable behavior in granting control over the audio playback function may be discouraged from using certain applications entirely.

Additional challenges arise where an audio signal generated by one of the applications and device functions is not comprehensible to the user or where information supplementary to the audio signal is desired.

Many classes of consumer electronics devices incorporate display devices capable of reproducing a display screen from video signals. Many applications for such devices intrinsically generate a video signal in addition to an audio signal. It is known to provide metadata for visual reproduction in parallel with the audio signal: the metadata may be, for example, the lyrics of a song, a translation of the dialogue into a different language, or a closed caption audio description of the action in multimedia content). The metadata may be synchronized with a video portion of multimedia content so that, for example, the lyrics of a song are arranged to appear on a user display at approximately the time they are sung in the audio portion of the same multimedia content.

Furthermore, audio playback is not always desirable, even when an audio signal is generated by an application. It is not uncommon for users to consume multimedia content without audio playback to avoid disrupting other people in their surroundings. Anticipating such operation, it is known to playback multimedia content with overlaid subtitles.

Embodiments of the present disclosure address these and other issues.

It is a goal to operate a more convenient policy governing access to the audio playback function. It is a further goal to ensure that policies governing the presentation of metadata cooperate effectively with the policy governing access to the audio playback function.

Where such a device simultaneously executes more than one application, each requesting access to the audio playback function, the device may grant one or more requesting application access in ways that are unexpected or undesirable. By default, an audio signal from the most recently instantiated application may be applied exclusively to the audio playback function. Any audio signal generated by another application may be muted, stopped or paused to allow uninterrupted playback of the audio signal from the most recently instantiated application.

Users experiencing unexpected or undesirable behavior in granting control over the audio playback function may be discouraged from using certain applications entirely. For example, a user may be playing back music content from a music streaming application and then open a news application intending to read the news content, but instead the audio signal for multimedia content presented by the news application may be given precedence over the audio signal from the music streaming application.

Embodiments of the present disclosure provide a method for determining which audio signal (or signals) from a plurality of applications is applied to an audio playback function in a device, the plurality of applications including a first application and a second application. The first application generates a first audio signal, while the second application generates a second audio signal.

In certain embodiments, the first application generates multimedia data including video data, the first audio signal being associated (and optionally synchronized) with the video data. An access policy may require that the first audio signal is no longer to be applied to the audio playback function when the second audio signal is received from the second application, even while the video data from the first application is being reproduced on a display of the device.

In certain embodiments, the first application also generates metadata associated with the first audio signal. Examples of metadata include subtitles, subtitles, closed caption/audio description ("CC"), translation, etc. The metadata may conveniently be stored in a subtitles file, such as a SubRip Text file (SRT) or Video Timed Text file (VTT). Unless the context indicates otherwise, the term "subtitles" is used in this disclosure to refer generically to metadata such as subtitles, subtitles and CC that may be presented textually, or otherwise visually, providing a visual alternative for a soundtrack of video footage. Thus, "subtitles" is not only the spoken words of characters, narrators, and other vocal participants—but may additionally be a supplement to dialogue that includes other relevant parts of the soundtrack describing the lyrics (and phrasing) of songs, background noises, phones ringing, and other audio cues that need to be described. The subtitles may equally be translations of the words used or a version of the soundtrack adapted to the user's preferences (for example, by removing or replacing profanity).

In certain embodiments, users may consume content, and specifically videos, reproduced by the first application without audio or sound and the presentation of subtitles increases the overall enjoyment of the content. When such content consumed without audio does include metadata such as subtitles, the subtitles are only presented when specifically requested by the user, Namely, to view the subtitles, the user has to stop playback of the content, navigate through several menus, activate the presentation of subtitles and then return to viewing the content with the subtitles. These steps place a burden on the user and make the user experience less seamless and enjoyable. In addition, because of this additional burden, users often fail to access the subtitles, which results in wasted resources dedicated to providing the unconsumed subtitles.

In certain embodiments the device may enable subtitle presentation by default, for instance by placing the subtitle presentation setting of the device in the enabled state. The burden then falls on the user to override that subtitle presentation setting when audio playback from a subtitled video content is preferred to subtitle presentation.

An access policy that indicates that the first audio signal (i.e. the audio output of the first application) is no longer to be applied to the audio playback function when the second audio signal (i.e. second audio output) is received from the second application may be defined. The access policy may further indicate that the metadata from the first application is to be presented on a screen of the device while the second audio signal is played back. Thus, the first application may generate video data and subtitles (say) for display while the second application generates audio data for playback by the audio playback function.

The disclosed embodiments therefore improve the efficiency of using the electronic device by providing a subtitle control system that provides users with an efficient and easy-to-user interface for providing subtitles content to accompany content played back from a first application when audio/sound content is being played back by a second, different, application.

The subtitle control system, according to the disclosed embodiments, also improves the efficiency of using the electronic device by automatically controlling presentation of subtitles (when available for a given video presented by a first application) based on the playback of audio/sound content by a second application. Specifically, according to the disclosed embodiments, a simple and straight-forward user interface is provided that allows a given user to view the visual components of video content from a first application while listening to the audio components of content reproduced by a second application. The given user is presented with subtitles for that video content, where suitable metadata is present.

In this way, the disclosed embodiments improve the efficiency of using the electronic device by reducing complexity that a user experiences when executing more than one application having audio content for playback. Subtitle presentation is triggered automatically, where subtitles are present for playback content, thereby reducing the number of screens and interfaces a user has to navigate through to ensure a desired balance of playback of content form the plurality of applications. This reduces the device resources (e.g., processor cycles, memory, and power usage) needed to accomplish a task with the device.

In some embodiments, a determination of whether to present subtitles to a given user viewing a video is made on the basis of volume controls. Namely, the disclosed embodiments seamlessly, and without user input, control whether to present subtitles for a video being consumed based on volume settings of the device. The device volume controls include an interface for increasing or decreasing the volume (i.e. volume UP/DOWN controls) and may be provided with a dedicated mute switch: these controls may be implemented in hardware and/or in software.

Volume control activity may be used to infer an alternative user playback requirement. Thus, the user pressing the volume UP button may be interpreted as a trigger to discontinue subtitle playback and/or to switch the source of audio content from second application to first application. The MUTE state of a mute switch may be used to infer that the subtitle presentation setting of the device should be in the enabled state but pressing the mute switch when the first application is executing may be interpreted differently: a single press may indicate the user desire for subtitles without altering the audio playback from the second application, while a double press or a press lasting longer than a predetermined time—2 seconds, say, may mute audio playback from all applications.

In certain embodiments, the device may detect actuation of an input device, the actuation of the input device may be interpreted as a request to override a default action (i.e., an action required by default by an access policy). For instance, in certain embodiments, the device may monitor for a user input via the volume UP/DOWN controls, while playing back audio content from a first application and watching a given video reproduced by a second application, to determine whether user playback requirements have changed. Whereas the default action may be to allow the audio signal from a newly opened application to take precedence over that of a previously executing application, the actuation of a volume button may trigger an alternative operation where the audio signal for the previously executing application continues to have access to the audio playback function and the newly opened application executes outputting a video data and metadata to a display function without outputting a corresponding audio signal to the audio playback function. As a result, the user may continue to listen to music from a previously executing music application, while executing a messaging client application in a silent/subtitle mode.

In this way, the disclosed embodiments improve the efficiency of using the electronic device by reducing the number of screens and interfaces a user has to navigate through to view (or discontinue viewing) subtitles for a given video. This reduces the device resources (e.g., processor cycles, memory, and power usage) needed to accomplish a task with the device.

In certain embodiments, at least one of the applications requesting access to the audio playback function is a messaging client application 104.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client applications 104, and between a messaging client application 104 and the messaging server system 108, includes functions e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, texture maps, virtual effects and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, a location sharing system 116, a social network system 122 and a subtitle control system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes a location sharing system 116 that is dedicated to performing various image processing operations, typically with respect to images or video received within the payload of a message at the messaging server application 114.

The application server 112 is communicatively coupled to a database server 118, which facilitates access to a database 120 in which is stored data associated with messages processed by the messaging server application 114.

Figure 2:
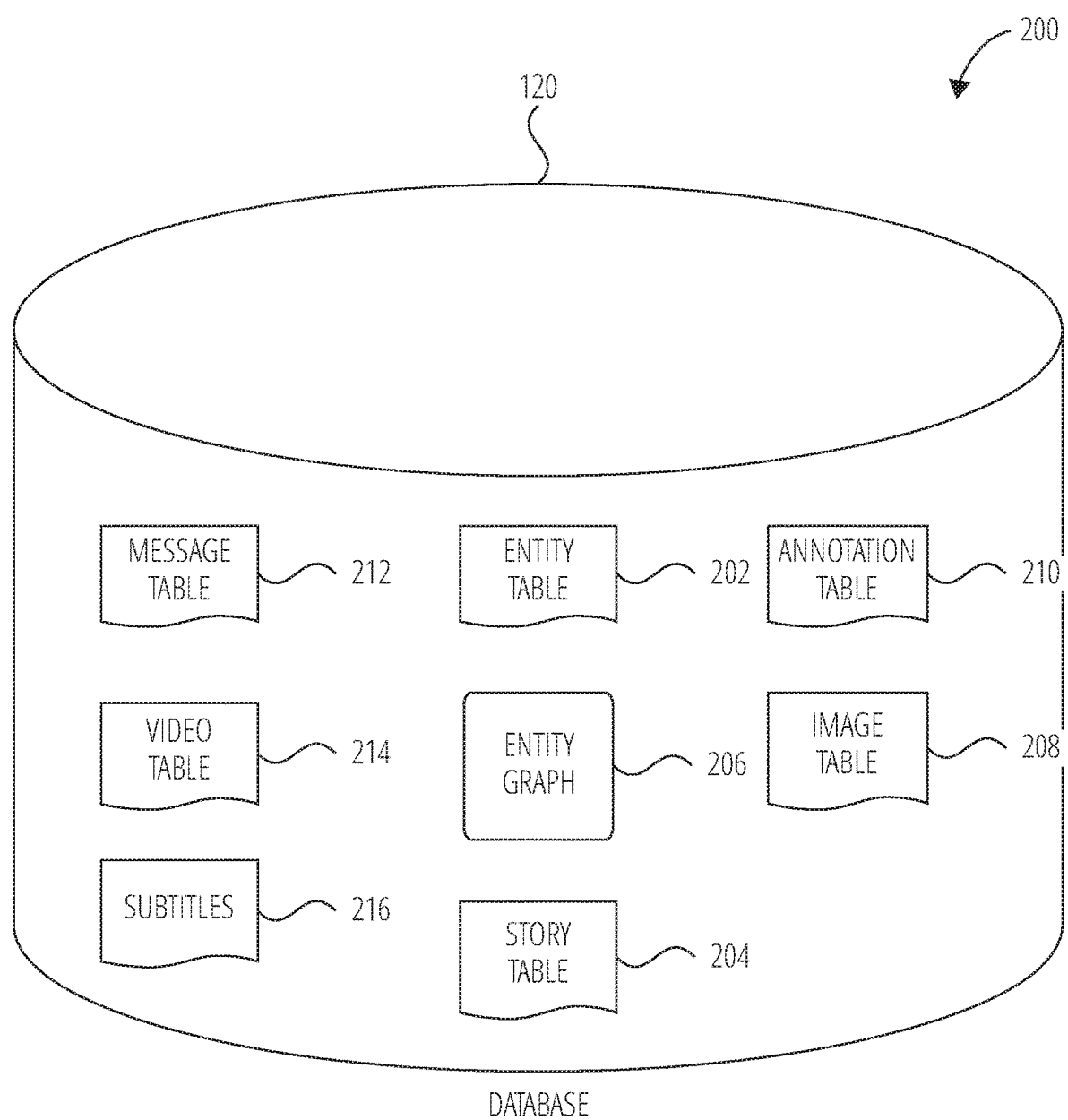
FIG. 2 is a diagrammatic representation of a data structure as maintained in a database, in accordance with some example embodiments.

The social network system 122 supports various social networking functions services and makes these functions and services available to the messaging server application 114. To this end, the social network system 122 maintains and accesses an entity graph 206 (as shown in FIG. 2) within the database 120. Examples of functions and services supported by the social network system 122 include the identification of other users of the messaging system 100 with which a particular user has relationships or is "following", and also the identification of other entities and interests of a particular user.

Examples of functions and services supported by the social network system 122 also include generating a geographically-based graphical user interface (GUI). This interface may be referred to herein as a "map GUI," and may be used in conjunction with a social media application. In some embodiments, the map GUI may include representations of at least approximate respective positions of a user and a user's friends in a social network graph accessed by the social media application using avatars for each respective user.

The social network system 122 may receive user authorization to use, or refrain from using, the user's location information. In some embodiments, the social network system 122 may likewise opt to share or not share the user's location with others via the map GUI. In some cases, the user's avatar may be displayed to the user on the display screen of the user's computing device regardless of whether the user is sharing his or her location with other users.

In some embodiments, the location sharing for a user can be turned off or on by the user from within the map GUI (e.g., via a setting accessed by a menu presented in conjunction with the map GUI). In some embodiments, the social network system 122 may still present the user's avatar at the user's current location on the map GUI on the user's own device after the user turns off location sharing. This mode is referred to herein as "ghost mode." In some embodiments, the social network system 122 may present an icon on the display screen of the user's computing device to indicate the user's location is not currently being shared with others.

Note that the ghost mode functionality described herein may be distinguished from turning off location services on a mobile user device. Accordingly, in some embodiments when ghost mode is turned on, the device location services are still functioning, so that the user's location can still be determined.

In some embodiments, when the user turns on ghost mode after previously sharing his or her location, and the user's avatar being displayed on the map, the user's avatar disappears from other users' maps. In some embodiments, when in ghost mode, the user may still see anyone on the map who has chosen to share their location with the user. In some embodiments the user may also be provided the option of specifying who will get to see their location, and at what granularity. Examples of granularity options that may be selected by a user include a "precise" option (e.g., the user's location will be presented on the map as accurately as the location information from the user's computing device can provide); and a random location within a predetermined area (e.g. a city) based on the location information from the user's computing device.

In some embodiments, when the user (or group of users) selects the random location granularity option, the user's avatar will be shown in the map GUI within a predetermined distance of the user's current location (e.g., within the predetermined area such as a city the user is in), and the position of the user's avatar will not change if the user does not leave that area. In some embodiments, the user's avatar may include a label specifying the geographic area in which the user is located (e.g., "New York City").

In some embodiments, a user can select groups of other users to which his/her location will be displayed and may in specify different display attributes for the different respective groups or for different respective individuals. In one example, audience options include: "Best Friends," "Friends," and "Custom" (which is an individual-level whitelist of people). In this example, if "Friends" are selected, all new people added to the user's friends list will automatically be able to see their location. If they are already sharing with the user, their avatars will appear on the user's map.

In some embodiments, when viewing the map GUI, the user is able to see the location of all his/her friends that have shared their location with the user on the map, each friend represented by their respective avatar. In some embodiments, if the friend does not have an avatar, the friend may be represented using a profile picture or a default icon displayed at the corresponding location for the friend.

In some embodiments, the user can select between friends on the map via a menu, such as a carousel. In some embodiments, selecting a particular friend automatically centers the map view on the avatar of that friend. Embodiments of the present disclosure may also allow the user to take a variety of actions with the user's friends from within the map GUI. For example, the system may allow the user to chat with the user's friends without leaving the map. In one particular example, the user may select a chat icon from a menu presented in conjunction with the map GUI to initiate a chat session.

The subtitle control system 124 controls automatic presentation of subtitles for content being consumed by a given user based on their volume controls. For example, subtitle control system 124 presents a simple and straight-forward graphical user interface that allows a given user to view video content ("videos"). The given user can universally add subtitles videos by toggling a subtitles presentation setting to an enabled state. Alternatively the user may selectively require that one or more pieces of video content are subtitled by dragging a subtitles file, such as a SubRip Text file (SRT) or Video Timed Text file (VTT), over an icon or representation of the given video and/or by selecting an upload option for the given video. Once added, the subtitles are automatically processed and associated with the given video and made available for consumption to other users when the video is shared on a messaging application.

In some embodiments, the subtitle control system 124 controls whether to present subtitles for a given video being consumed based on volume settings of the device. In particular, the subtitle control system 124 determines whether a dedicated physical mute switch of the device is currently in the enabled position (meaning that the audio function of the device is to be muted). In response to determining that the physical mute switch is in the enabled position, the subtitle control system 124 automatically determines whether a subtitles file is associated with the video being consumed and, if so, automatically presents the subtitles with the video being consumed on the device. Also, the subtitle control system 124 determines whether a subtitles presentation setting of the device is currently in a state where subtitles are presented by default. In response to determining that the default subtitles setting is in the enabled position, the subtitle control system 124 automatically presents the subtitles for any video the user consumes on the device.

It is noted that while the subtitle control system 124 in FIG. 1 is described as a component of the messaging server system 108, part or all of its functionality may be performed in the messaging client application 104 of the client device 102.

FIG. 2 is a schematic diagram illustrating data structures 200 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 212. An entity table 202 stores entity data, including an entity graph 206. Entities for which records are maintained within the entity table 202 may include individuals (e.g., users), corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 206 furthermore stores information regarding relationships and associations between entities. Such relationships may be social, professional (e.g., work at a common corporation or organization) interested-based or activity-based, merely for example.

Message table 212 may store a collection of conversations between a user and one or more friends or entities. Message table 212 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 210. Database 120 also stores annotated content received in the annotation table 210. Filters for which data is stored within the annotation table 210 are associated with and applied to videos (for which data is stored in a video table 214) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

As mentioned above, the video table 214 stores video data which, in one embodiment, is associated with messages for which records are maintained within the message table 212. Similarly, the image table 208 stores image data associated with messages for which message data is stored in the entity table 202. The entity table 202 may associate various annotations from the annotation table 210 with various images and videos stored in the image table 208 and the video table 214.

Subtitles 216 stores subtitles for one or more videos available for consumption by the messaging client application 104. Namely, subtitles 216 stores a subtitles file (e.g., an SRT and/or VTT file) and a link to the associated video for the subtitles file. In some implementations, subtitles that are received for a given video are stored in two formats (e.g., SRI and VTT). Specifically, in response to a given user uploading a subtitles file in a first format (e.g., an SRT file), the subtitles file in the first format is stored in association with the corresponding video. Also, the subtitles file in the first format is automatically converted to a subtitles file in a second format (e.g., a VTT file) and also stored in association with the video in the second format. A given request for subtitles for a given video may specify the type of device on which the subtitles are to be presented and the corresponding subtitles in the first or second format are retrieved and returned for presentation with the video.

When subtitles for a given video being played or presented are enabled (e.g., a determination is made by the subtitle control system 124 to automatically present subtitles), the subtitles 216 for the given video are accessed and retrieved (e.g., by obtaining a title or identifier of the given video being consumed and searching the subtitles 216 for any subtitles that are linked to the title or identifier of the given video). The subtitles retrieved from subtitles 216 that are linked to the given video being played are then presented together with the given video being played.

A story table 204 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story. Video content played back by applications may include such stories.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
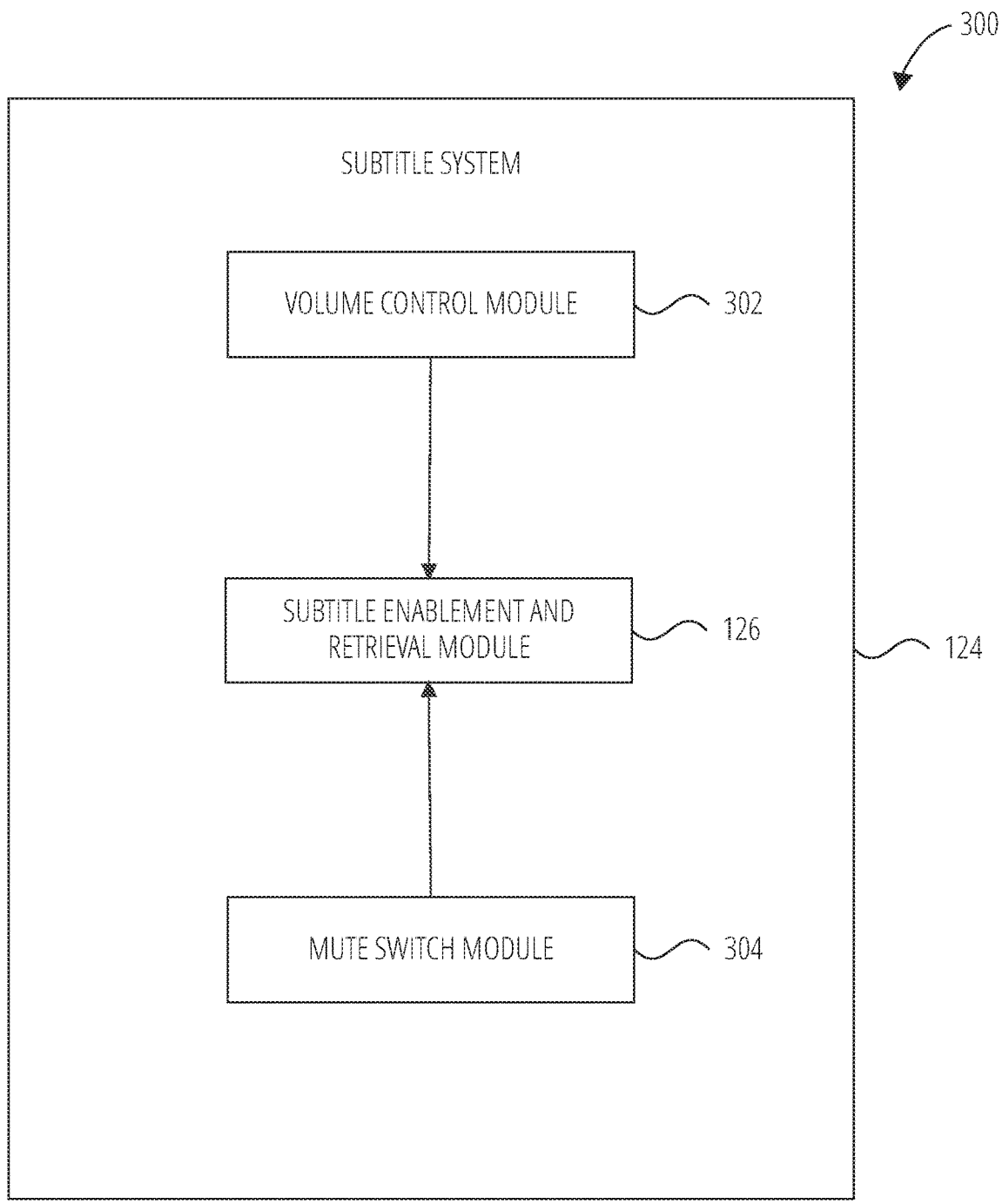
FIG. 3 is a block diagram 300 showing an example subtitle control system, according to example embodiments.

FIG. 3 is a block diagram 300 showing an example subtitle control system, according to example embodiments. As noted previously, the subtitle control system 124 may be implemented in either a user device (such as client device 102) or a server device (as illustrated in FIG. 1). Subtitle control system 124 includes a volume control module 302, a mute switch module 304, and a subtitle enablement and retrieval module 126.

Volume control module 302 continuously (or in response to detecting activation of a volume button) monitors volume controls of a user device (e.g., client device 102). The volume controls may include physical volume UP/DOWN buttons on the user device. In some cases, the volume control module 302 monitors the volume controls when audio content is being played back by a first application and a video is being played back by a second application (such as messaging client application 104).

In response to the volume control module 302 detecting activation of a volume DOWN button or a volume UP button on the user device (e.g., while audio content is being played back by the first application and video is being played back by the second along with subtitles), the volume control module 302 communicates with the subtitle enablement and retrieval module 126 to toggle the presentation of subtitles to a disabled state.

The mute switch module 304 similarly monitors for user input at the mute switch of the device. In response to a detected user input at the mute switch, the subtitle enablement and retrieval module 126 operates to retrieve and display subtitles (when the mute is enabled) and to cease or override previous subtitle display (when the mute is disabled). If entering a mute state, the volume control module 302 may retrieve an identifier of a current multimedia content item being played back by the display function (e.g. through a graphical user interface of a user device display). The identifier may be provided to a database to search subtitles 216 for any available subtitles for the content item being played back. If a match is found in subtitles 216, the subtitles file is retrieved. In addition, a current playback position is retrieved and used as an index in the subtitle file to access the correct set of subtitles for the current play position of the video (e.g., to access the subtitles corresponding to the 1:30 [minute:second] segment of the video). The subtitles are presented simultaneously over or next to the video frames of the video. In some cases, a language of the device is searched to determine whether language is desired in a specific language other than a default language. If so, the subtitles in the desired language (if available) are retrieved and displayed.

In some embodiments, the subtitle enablement and retrieval module 126 may access a display characteristics field that is stored on the user device. The subtitle enablement and retrieval module 126 may modify the display characteristics (e.g., the font size, color, and shape) of the subtitles that are presented with the video being played. The subtitles may be presented on an area of the screen that does not impede any important aspect of the video content.

In some embodiments, the subtitle enablement and retrieval module 126 may monitor user interactions while the video is being played to determine whether to display or to continue to display subtitles. For example, the subtitle enablement and retrieval module 126 may detect, by receiving an instruction from the mute switch module 304, that the mute switch has been moved to the enabled position in which audio of the device is muted (or that the volume controls monitored by the volume control module 302 have gradually reduced the volume level of 0%). In response, the subtitle enablement and retrieval module 126 may automatically retrieve and display subtitles for a video being played back and any subsequent videos that are played back.

In some embodiments, the subtitle enablement and retrieval module 126 may detect that a touch and hold action is performed by the user while the video is being played back. For example, the subtitle enablement and retrieval module 126 may detect physical contact by a user's finger with a display in which the video is being played back. The physical contact may be continuous for more than a threshold period of time (e.g., more than 3 seconds) in which the finger is not lifted or removed from physically contacting the display. In response, the subtitle enablement and retrieval module 126 may present an overlay on the video being played back that includes a menu of options. The options may include a subtitles option that allows a user to toggle the activation of subtitle (switching between a state where subtitles are turned on/activate for the graphical user interface or turned off/deactivated).

In some embodiments, the subtitle enablement and retrieval module 126 may access the default global subtitles setting of the user device to determine whether to display subtitles. In response to determining that the default global subtitles setting of the user device is set to the enabled state, the subtitle enablement and retrieval module 126 may automatically retrieve and display subtitles for a video being played back and any subsequent videos that are played back.

Figure 4:
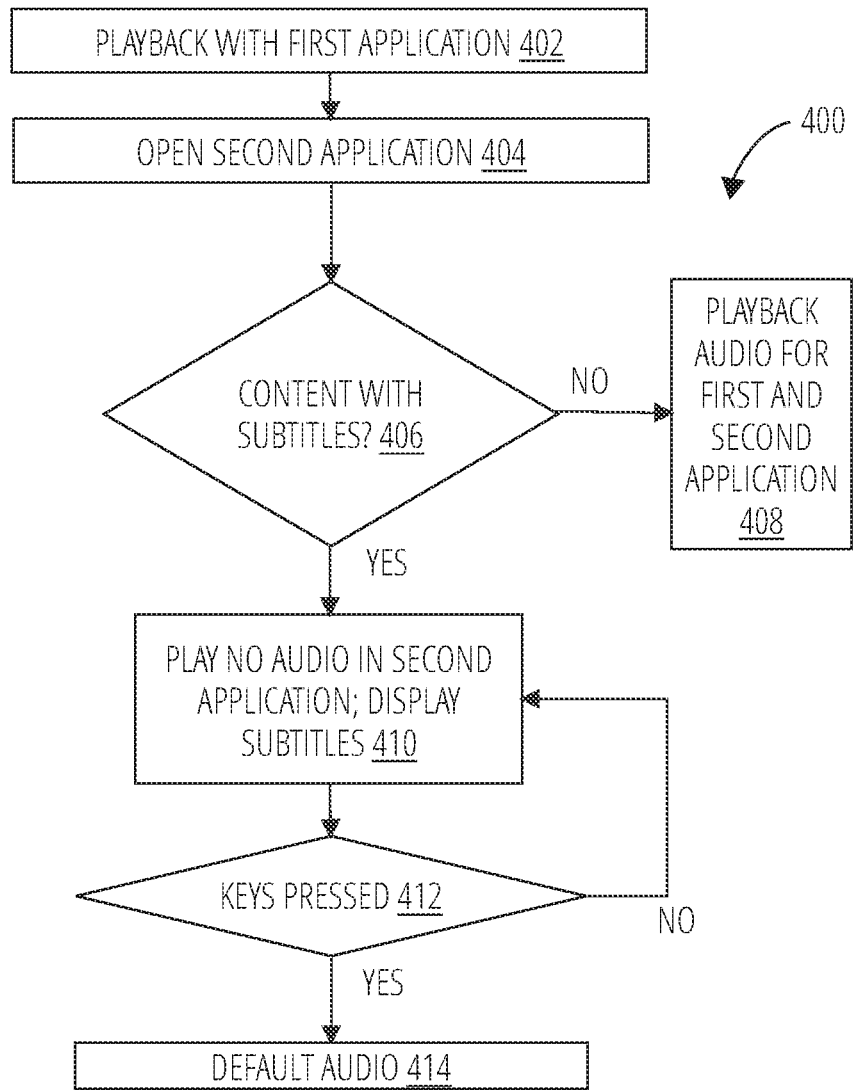
FIG. 4 illustrates the operation of an exemplary system for controlling audio playback in accordance with the present disclosure.

FIG. 4 illustrates the main operational blocks in a typical routine 400 in accordance with the present disclosure. The routine determines how the presence of respective audio signals generated or otherwise output by a plurality of applications is to be handled, and which one (or ones) of the audio signals are to be applied to an audio playback function in a device.

At block 402, a first application is executing. The first application generates audio data, which is played back by the audio playback function. The first application may, for example, be a music streaming application that outputs music, via the audio playback function: the user listens to that music through headphones or speakers coupled to the device. There being no other source of audio data, precedence of access to the audio playback function is granted to the first application.

At block 404, a second application is started. The second application outputs multimedia content, the multimedia content includes video data and audio data. The second application may be at least one of a multimedia playback application, a camera application, or a messaging client application. While certain aspects (i.e., operational modes) of the second application may have no impact on the operation of the audio playback function (e.g., a chat function, a visual augmentation function or a camera function), other operational modes do have an impact (such as when the multimedia content has a sound track of its own). Optionally, the device may detect whether an operational mode of the second application is likely to have an impact on the operation of the audio playback function.

At decision block 406, the device optionally determines whether the multimedia content from the second application includes metadata (such as subtitle information).

If it is determined that the multimedia content from the second application does not include metadata, the device may then grant each of the first and second application access to the audio playback function, block 408. The respective audio signals may be mixed together with no precedence of access or with precedence according to an audio mixing algorithm.

If it is determined that the multimedia content from the second application does include metadata, and optionally the operational mode of the second application is determined to be likely to have an impact on audio playback function operation, the device causes the audio playback function to deny the second application access to the audio playback function and instead to display the metadata (e.g., subtitles or audio description information), block 410. The second application is executed in silent/subtitle mode.

The device is arranged to monitor for key press inputs, and if a key press of a volume button (for example) is detected (decision block 412), that keypress is interpreted as a request to toggle the mode of operation of the second application to a default operation, block 314.

Figure 5:
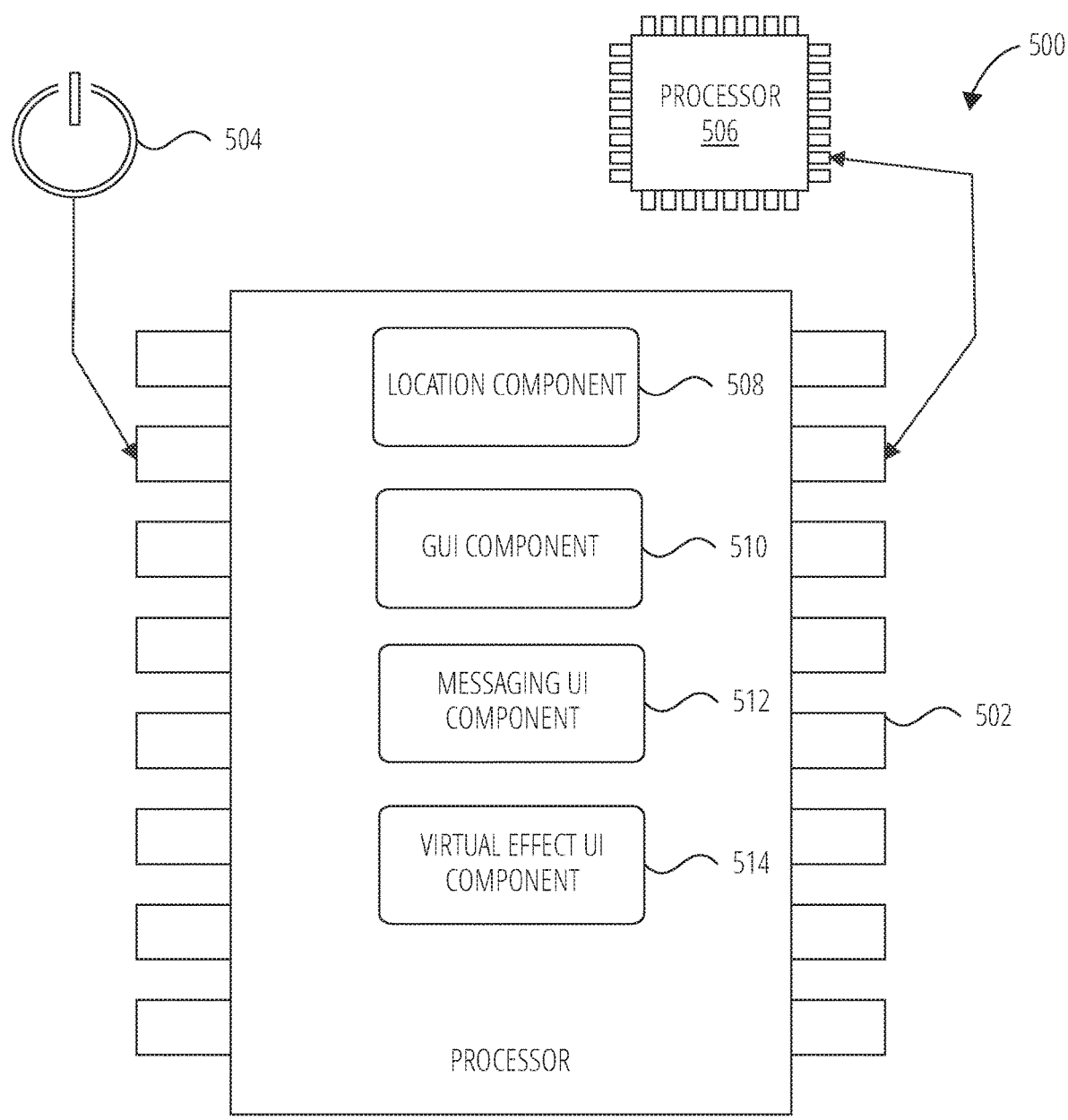
FIG. 5 is a diagrammatic representation of a processing environment, in accordance with some example embodiments.

Turning now to FIG. 5, there is shown a diagrammatic representation of a processing environment 500, which includes at least a processor 502 (e.g., a GPU, CPU or combination thereof). The processing environment 500 may be implemented in a user device, such as client device 102, arranged to capture video frames in real-time and to process and display augmented or virtual reality 3D experiences as described below.

The processor 502 is shown to be coupled to a power source 504, and to include (either permanently configured or temporarily instantiated) modules, namely a location component 508, a GUI component 310, a messaging UI component 512, and a virtual effect UI component 514. The location component 508 operationally determines location of users based on location information. The GUI component 310 operationally generates user interfaces and causes the user interfaces to be displayed on client devices. The messaging UI component 512 operationally generates user interfaces and causes the user interfaces to be displayed on client devices. As illustrated, the processor 502 may be communicatively coupled to another processor 506.

In certain embodiments, the virtual effect UI component 514 performs semantic segmentation upon image frames from an image capture device (i.e. a video stream), as described in detail below, and generates augmented or virtual reality 3D experiences for presentation in user interfaces generated by the GUI component 510. In certain embodiments, the virtual effect UI component 514 is implemented in a graphics processing unit (GPU). In certain embodiments, the processor 502 is, itself, a GPU.

Figure 6:
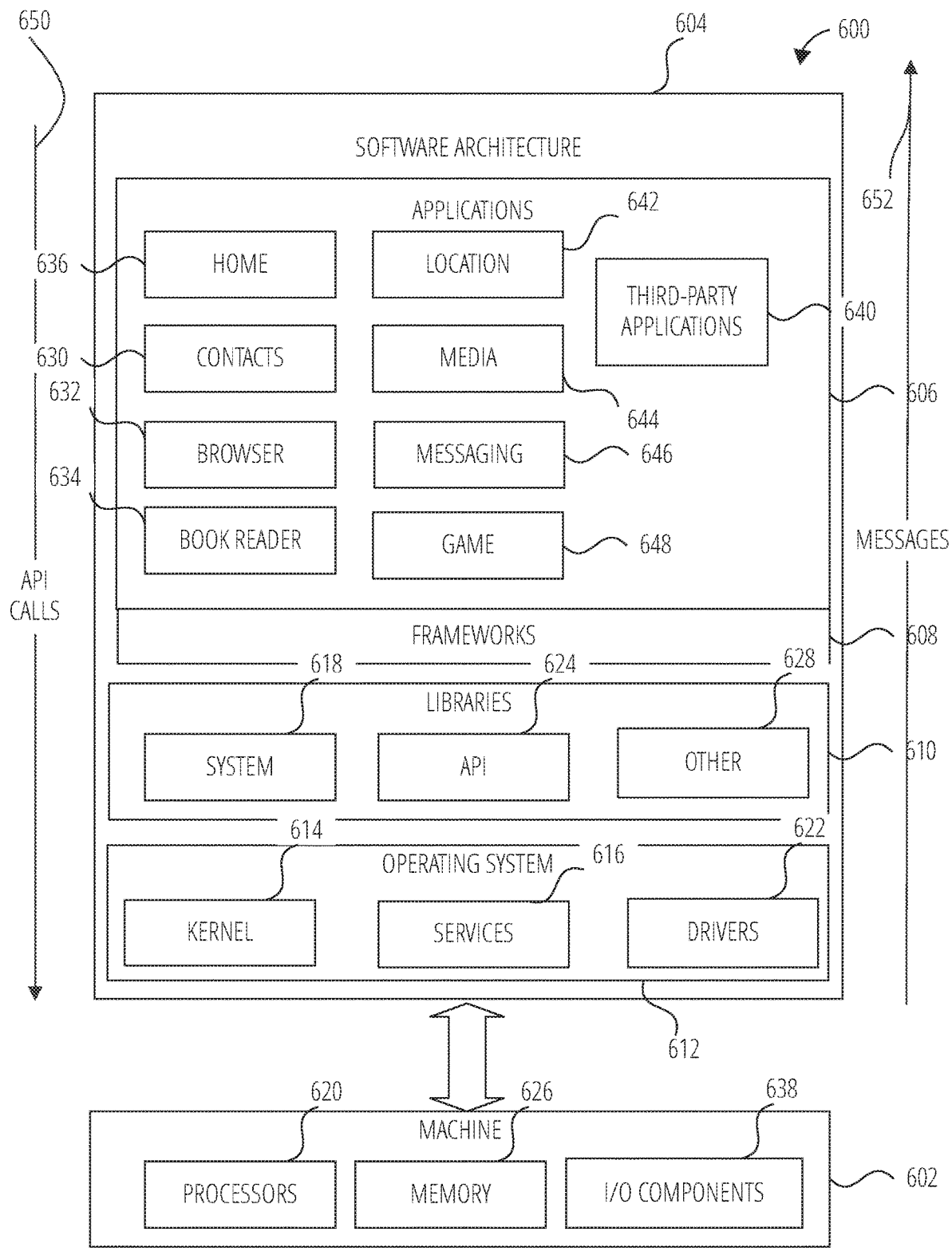
FIG. 6 is block diagram showing a software architecture within which the present disclosure may be implemented, in accordance with some example embodiments.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionality. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 610 provide a low-level common infrastructure used by the applications 606. The libraries 610 can include system libraries 618 (e.g., C standard library) that provide functions such as memory allocation functions, string manipulation functions, mathematic functions, and the like, in addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a high-level common infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example embodiment, the applications 606 may include a home application 636, a contacts application 630, a browser application 632, a book reader application 634, a location application 642, a media application 644, a messaging application 646, a game application 648, and a broad assortment of other applications such as third-party applications 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party applications 640 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 640 can invoke the API calls 650 provided by the operating system 612 to facilitate functionality described herein.

Figure 7:
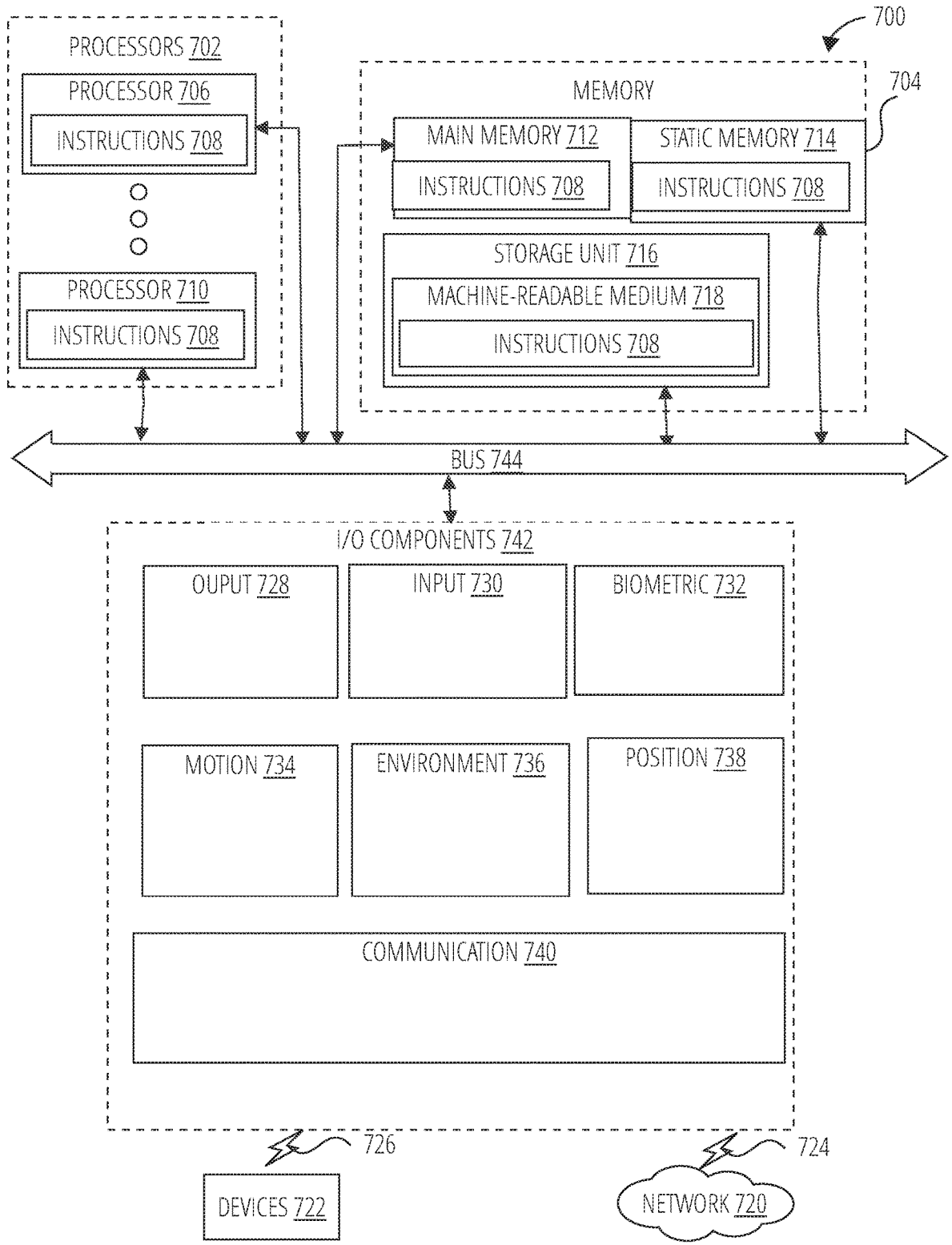
FIG. 7 is a diagrammatic representation of a machine, in the form of a computer system within which a set of instructions may be executed for causing the machine to perform any one or more of the methodologies discussed, in accordance with some example embodiments.

FIG. 7 is a diagrammatic representation of a machine 700 within which instructions 708 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein.

The machine 700 may include processors 702, memory 704, and I/O components 742, which may be configured to communicate with each other via a bus 744. In an example embodiment, the processors 702 (e.g., a Central Processing Unit (CPU), a Reduced Instruction Set Computing (RISC)

processor, a Complex Instruction Set Computing (CISC) processor, a Graphics Processing Unit (GPU), a Digital Signal processor (DSP), an ASIC, a Radio-Frequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single core, a single processor with multiple cores (e.g., a multi-core processor), multiple processors with a single core, multiple processors with multiples cores, or any combination thereof. The processors 502 may form a processing environment as illustrated in FIG. 5.

The memory 704 includes a main memory 712, a static memory 714, and a storage unit 716, both accessible to the processors 702 via the bus 744. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the processor's cache memory), or any suitable combination thereof, during execution thereof by the machine 700.

The I/O components 742 may include a wide variety of components to receive input, provide output, produce output, transmit information, exchange information, capture measurements, and so on. The specific I/O components 742 that are included in a particular machine will depend on the type of machine. For example, portable machines such as mobile phones may include a touch input device or other such input mechanisms, while a headless server machine will likely not include such a touch input device. It will be appreciated that the I/O components 742 may include many other components that are not shown in FIG. 7. In various example embodiments, the I/O components 742 may include output components 728 and input components 730. The output components 728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), video input components (e.g. a camera or other image capture device) and the like.

In further example embodiments, the I/O components 742 may include biometric components 732, motion components 734, environmental components 736, or position components 738, among a wide array of other components. For example, the biometric components 732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 742 further include communication components 740 operable to couple the machine 700 to a network 720 or devices 722 via a coupling 724 and a coupling 726, respectively. For example, the communication components 740 may include a network interface component or another suitable device to interface with the network 720. In further examples, the communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 722 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geolocation, location via Wi-Fi® signal triangulation, location via detecting an NFC beacon signal that may indicate a particular location, and so forth.

The various memories (e.g., memory 704, main memory 712, static memory 714, and/or memory of the processors 702) and/or storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed embodiments.

The instructions 708 may be transmitted or received over the network 720, using a transmission medium, via a network interface device (e.g., a network interface component included in the communication components 740) and using any one of a number of well-known transfer protocols (e.g., hypertext transfer protocol (HTTP)). Similarly, the instructions 708 may be transmitted or received using a transmission medium via the coupling 726 (e.g., a peer-to-peer coupling) to the devices 722.

What is claimed is:

1. A computer-implemented method performed by one or more processors of a user device, the method comprising:
   executing a first application, the first application generating a first audio output and a first video output from one or more multimedia content items;
   providing the first audio output to an audio playback function of the user device;
   causing the audio playback function to reproduce the first audio output;
   providing the first video output to a display function of the user device;
   detecting a user request to execute a second application, the second application being configured to generate a second audio output and a second video output;
   upon detecting the user request:
      executing the second application; and
      determining whether the first application further generates a first subtitle output from the multimedia content items;
   in response to determining that the first application generates the first subtitle output from the multimedia content items:
      providing the second audio output of the second application to the audio playback function of the user device; and
      causing the audio playback function to reproduce the second audio output of the second application while the display function of the user device causes display of the first video output of the first application;
   detecting a user input via volume controls of the user device; and
   in response to detecting the user input, causing the audio playback function to reproduce the first audio output of the first application while the display function of the user device causes display of the second video output of the second application.

2. The computer-implemented method of claim 1, wherein causing the audio playback function to reproduce the second audio output further includes causing the audio playback function to discard the first audio output.

3. The computer-implemented method of claim 1, wherein causing the audio playback function to reproduce the second audio output further includes ceasing to provide the first audio output to the audio playback function.

4. The computer-implemented method of claim 1, further comprising:
   causing the display function to reproduce the first video output.

5. The computer-implemented method of claim 1, wherein providing the first video output to the display function of the user device further comprises
   when first subtitle output is generated corresponding to the first video output, providing the first subtitle output to the display function of the user device for display over the first video output.

6. The computer-implemented method of claim 5, further comprising:
   determining whether a user input to alter audio playback of the user device is received; and
   upon determining that the user input has been received, ceasing to provide the second audio output to the audio playback function and causing the audio playback function to reproduce the first audio output.

7. The computer-implemented method of claim 6, further comprising ceasing to provide the first subtitle output to the display function upon determining that the user input has been received.

8. A user device providing an audio playback function and a display function, the user device comprising:
   one or more processors; and
   a memory storing instructions that, when executed by the one or more processors, implement the audio playback function and the display function and configure the device to:
   execute a first application, the first application generating a first audio output and a first video output from one or more multimedia content items;
   provide the first audio output to the audio playback function;
   cause the audio playback function to reproduce the first audio output;
   provide the first video output to the display function;
   detect a user request to execute a second application, the second application being configured to generate a second audio output and a second video output;
   upon detecting the user request:
      execute the second application; and
      determine whether the first application further generates a first subtitle output from the multimedia content items;
   in response to determining that the first application generates the first subtitle output from the multimedia content items:
      provide the second audio output of the second application to the audio playback function; and
      cause the audio playback function to reproduce the second audio output of the second application while the display function of the user device causes display of the first video output of the first application
   detect a user input via volume controls of the user device; and
   in response to detecting the user input, cause the audio playback function to reproduce the first audio output of the first application while the display function of the user device causes display of the second video output of the second application.

9. The user device of claim 8, wherein causing the audio playback function to reproduce the second audio output further includes causing the audio playback function to discard the first audio output.

10. The user device of claim 8, wherein causing the audio playback function to reproduce the second audio output further includes ceasing to provide the first audio output to the audio playback function.

11. The user device of claim 8, wherein the instructions further configure the device to:
   cause the display function to reproduce the first video output.

12. The user device of claim 8, wherein providing the first video output to the display function further comprises when first subtitle output is generated corresponding to the first video output, provide the first subtitle output to the display function for display over the first video output.

13. The user device of claim 12, wherein the instructions further configure the device to:
   determine whether a user input to alter audio playback of the user device is received; and
   upon determining that the user input has been received, cease to provide the second audio output to the audio playback function and causing the audio playback function to reproduce the first audio output.

14. The user device of claim 13, wherein the instructions further configure the device to cease to provide the first subtitle output to the display function upon determining that the user input has been received.

15. A non-transitory computer-readable storage medium, the computer-readable storage medium including instructions that when executed by a computer, cause the computer to:
   execute a first application, the first application generating a first audio output and a first video output from one or more multimedia content items;
   provide the first audio output to an audio playback function of a user device;
   cause the audio playback function to reproduce the first audio output;
   provide the first video output to a display function of the user device;
   detect a user request to execute a second application, the second application being configured to generate a second audio output and a second video output;
   upon detecting the user request:
      execute the second application; and
      determine whether the first application further generates a first subtitle output from the multimedia content items;
   in response to determining that the first application generates the first subtitle output from the multimedia content items:
      provide the second audio output of the second application to the audio playback function; and
      cause the audio playback function to reproduce the second audio output of the second application while the display function of the user device causes display of the first video output of the first application
   detect a user input via volume controls of the user device; and
   in response to detecting the user input, cause the audio playback function to reproduce the first audio output of the first application while the display function of the user device causes display of the second video output of the second application.

16. The computer-readable storage medium of claim 15, wherein causing the audio playback function to reproduce the second audio output further includes causing the audio playback function to discard the first audio output.

17. The computer-readable storage medium of claim 15, wherein causing the audio playback function to reproduce the second audio output further includes ceasing to provide the first audio output to the audio playback function.

18. The computer-readable storage medium of claim 15, wherein the instructions further configure the computer to:
   cause the display function to reproduce the first video output.

19. The computer-readable storage medium of claim 15, wherein providing the first video output to the display function of the user device further comprises
   when first subtitle output is generated corresponding to the first video output, providing the first subtitle output to the display function of the user device for display over the first video output.

20. The computer-readable storage medium of claim 19, wherein the instructions further configure the computer:
   to determine whether a user input to alter audio playback of the user device is received; and
   upon determining that the user input has been received, to alter audio playback by:
   ceasing to provide the second audio output to the audio playback function,
   causing the audio playback function to reproduce the first audio output, and
   ceasing to provide the first subtitle output to the display function.

* * * * *